A. Patterson,
Steam Safety Valve.
Nº 3,960.  Patented Mar. 21, 1845.
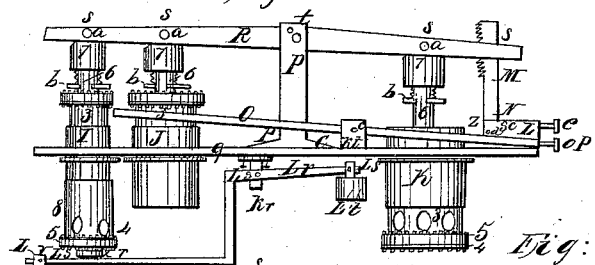
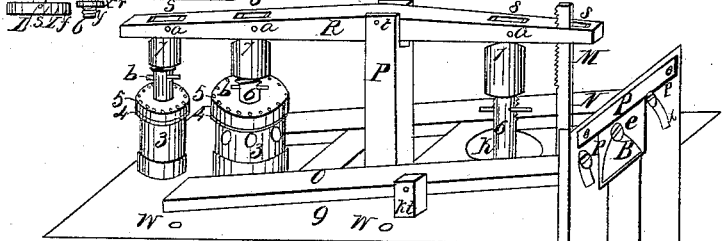
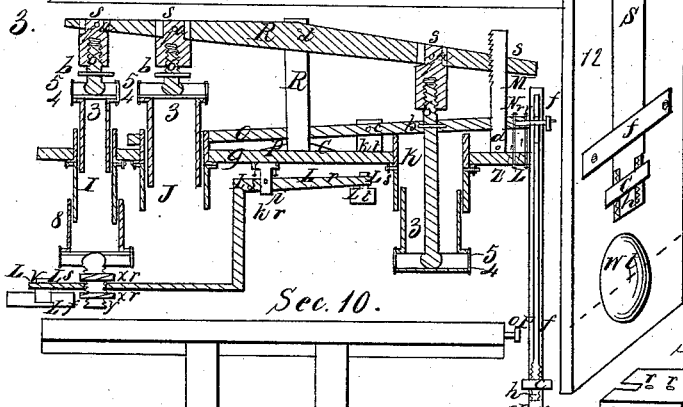
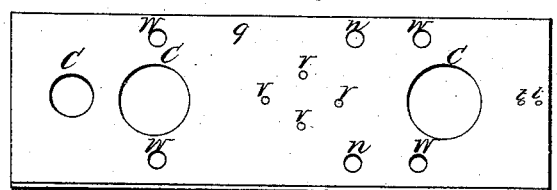

UNITED STATES PATENT OFFICE.

ABRAM PATTERSON, OF RUSH, PENNSYLVANIA.

SAFETY-VALVE OF STEAM-BOILERS.

Specification of Letters Patent No. 3,960, dated March 21, 1845.

*To all whom it may concern:*

Be it known that I, ABRAM PATTERSON, of Rush, in the county of Susquehanna and State of Pennsylvania, have invented a new and improved safety-valve to prevent steam-boilers from bursting and from breaking by collapse and also a new and improved working column and pendulum for the opening of safety-valves; and I do hereby declare that the following is a full and exact description.

The nature of my invention consists in the construction, arrangement, and employment of a safety valve as hereinafter described, and also, in the employment of a working column, for the opening of a safety valve for steam boilers; and also, in the employment of a pendulum, for the opening of a safety valve for steam boilers, as hereinafter described, reference being had to the annexed drawings, making a part of this specification, in which—

Figure 1, is a transverse view, without the pendulum. Fig. 2, a perspective view, with the pendulum on. Fig. 3, a section, showing the apparatus cut vertical and longitudinal.

I, represents the working column; J, and K, parts of the safety valve, or reacting safety valve; I, J and K, also represent the stationary cylinders of their respective parts; 3, 3, 3, 3, sliding cylinders; 4, 4, 4, 4, lids; 5, 5, 5, 5, sockets of ball and socket points; 6, 6, 6, 6, screw stems of the points; 7, 7, 7, shafts; 8, sliding valve of the working column; *y*, screw stem of the sliding valve of the working column; *xr*, *xr*, collars, to confine the weights; R, beam; *s*, *s*, *s*, *s*, mortises; M, dog; Z, dog mortise; N, dog spring; *d*, dog pivot; P, pivot post; P, C, collar on the foot of the pivot post, by which to confine the same to the plate; *g*, plate; C, C, C, perforations for the fixed cylinders I, J and K; *v*, *v*, *v*, *v*, perforations for the bolting down of the pivot post; *n*, *n*, perforations for the lever posts; *t*, *t*, perforations to secure the pendulum block; *w*, *w*, *w*, *w*, perforations for the confining of the plate, or it may be otherwise secured; *c*, lever pivot; *kt*, lever posts; *op*, *op*, opening pivots; X, X, open pivot boxes; L, pendulum block; *a*, *a*, *a*, shaft pivots; *e*, suspending pivot; *s*, *c*, saw cut for the spring; O, lever, also section 10, section 11, pendulum block as seen at L, 12, and section 12, pendulum; S, slide; B, center box; *h*, regulating screw; C, collar screw of the regulating screw; *f*, *f*, bars holding the slide; *wt*, weight; *ot*, beam pivot; *b*, *b*, *b*, bolt wrenches; *r*, *r*, block holdings; *kr*, beam block with bolts for the confining the block to the boiler; L*r*, float beam; L*t*, weight; L*f*, float; L*v*, float stem; L*s*, L*s*, L*s*, pivots.

The part of the apparatus represented by I, is the working column, and is formed by the putting together of the sections 2, 3, 4, 5, 6, 7 and 8, seen in the drawings, and is thus formed: I make two cylinders like that represented by section 1, each having an outward projecting rim, with perforations corresponding to each other. I then place the rimmed ends of these cylinders, with their rimmed ends together, in such manner that, the perforations in each rim correspond to each other, and unite them, by bolting through the said perforations; thus forming one entire cylinder, as represented by section 2, with a rim passing round the same, said rim being perforated for the purpose of bolting down on to a steam boiler. I then make another cylinder as represented by section 3, with an outward projecting perforated rim at the upper end, for the bolting on of the lid and box of the joint. This cylinder is of equal length, with that shown at section 2, and of so much smaller diameter, as to slide easily into the same. I then make a lid, as shown at section 4, of equal diameter with the rim of cylinder section 3, with corresponding perforations. I then make the box of the ball and socket joint, as shown at section 5, with perforations, corresponding to those of the lid section 4, and of sufficient thickness, to form the box of the joint; the box is bored down through the center, to receive the screw stem, and counter-bored, from the bottom, to receive the ball of the stem. I then make a screw stem, as shown at section 6, with a ball at one end; and bore the stem through, a little above the ball; for the introduction of a bolt wrench; I then pass the stem of the ball, up through the box. I then place the box, on to the lid, and these onto the top of the projecting rim of cylinder seen at section 3, and bolt the whole firmly together. I then make a shaft as seen at section 7, the upper end of which, is tenoned and bored through its shortest diameter; and the lower end is bored, and tapped with a screw, to considerable depth, to fit the screw stem of section 6. I then introduce the bolt-wrench, into the screw-stem of the ball and socket joint; and then screw the screw-stem into the lower end of the shaft, thus forming a contracting and elongating shaft, of pieces seen at sections 6, and 7. I then slide the cylinder attached to this shaft, into the cylinder, shown at section 2. I then make another cylinder, with an outward projecting, perforated rim, as before, as shown at section 8, of such diameter, as to easily slide on to the lower end of cylinder, seen at section 2. The rim of the last made cylinder, I furnish with a lid and ball and socket joint, with a screw-stem on the ball, and two collars are screwed on to the stem, as seen at the bottom of section 8, and also at the bottom of the working clumn; I then perforate the last made cylinder close to the lid, or rim, as much as may be without weakening it too much; I then slide this last made cylinder on to the lower end of cylinder shown at section 2, as seen at the bottom of the working column, Fig. 1. I then fit the lower sliding cylinder up to the lower end of the stationary cylinder, seen at I, Fig. 1, being steam tight, between the upper surface of the lid of the sliding cylinder and the lower end of the stationary cylinder, seen at I, Fig. 1, leaving the lid of the sliding cylinder above, not tight, that air may be admitted, when the said upper sliding cylinder, is elevated otherwise, than by a column of steam. The lower sliding cylinder is secured in its place by the weight and tackle hereafter to be described, which are attached to the screw-stem at the bottom of the lower sliding cylinder.

The parts represented by J, are like those shown by I, with these differences, viz: the cylinders are of much larger diameter; and are destitute of that portion shown at section 8, and the lid of the sliding cylinder, is accurately fitted steam tight, on to the upper end of the fixed, or stationary cylinder, and the sliding cylinder, is perforated, close to the lid, for the escape of steam. The parts shown at K, are of the same length with J, and a little larger diameter. The cylinder 3, sliding within K, is in inverted. The ball and socket joint is here placed inside, and the screw-stem is of sufficient length, to compensate for the inversion of the sliding cylinder; in all other respects, the cylinders, screw-stem and shaft; and all the rest represented, or seen at K, are verily like those of J.

The sliding cylinder being perforated for the escape of steam, I then make the beam R, with mortises as seen at S, S, S, S, in a vertical direction, corresponding to the tops of the several shafts seen at, or above I, J and K, and one through which the dog passes, and the end of this, next to the shaft is cut so as to allow the teeth of the dog to hook on and to hold; this mortise is in length, about twice the width of the dog. I then bore the beam, transversely through the center between the centers of the mortises made for the tops of the shafts, seen at the tops of the parts J and K. I then make a pivot post, as shown at P, with a collar at the foot, as shown at P, C, and screw it down on to the plate, equidistant between the centers of J and K, which post is notched down into the top, and bored through, for the receiving, and suspending of the beam. I then make a plate, as shown at g, and at section g, with several perforations, viz: C, C, C, for I, J and K, with diameters to fit these stationary cylinders, in their proper situations, and at their respective distances from each other, measured on the beam, between the pivots passing through the tops of the shafts. I then make v, v, v, v, perforations, through which to bolt down the pivot post by its collar; I also make n, n, perforations for the lever posts; and t, t, perforations for the securing of the pendulum block, and also, w, w, w, w, perforations for the fastening of the plate. I then make a lever as seen at O, and at section 10, which I make of four pieces of wood, or bars of metal two of these are long, and two are short, the length of the longest is indicated by the distance from the pendulum end of the plate, to the middle point between the cylinders I and J. The length of the shortest, I make the whole width of the lever, which, at the pendulum end must be such that, when the opening pivots placed in the center of the pendulum ends of the bars of the lever, the distance from the center of one opening pivot, to that of the other, shall be equal to the distance from the center of one opening pivot box, to the center of the other, taken in the tops of the boxes in the pendulum, shown at X, X. The distance inside of the opposite end of the lever, I make such, that it passes both sides of the fixed cylinder at J, and does not touch, but lies with its upper and inner edges a little below the rim of the sliding cylinder within J. I then fix the opening pivots, into the pendulum ends of the lever. The lever is framed firmly together and secured in its place by pivots passing through posts set at n, n, into the lever. I then make a pendulum block as seen at L, and section 11, at the pendulum end is fixed a suspending pivot, as seen at e, being fixed in the center between the two opening pivots, and screwed into the pendulum block and of such height that it is in a direct line with the opening pivots fixed in the lever, that is, when the pendulum is at rest, and the pendulum end of the lever elevated, by the specific gravity of the opposite end, or I balance it by a weight. At the other end of the pendulum block, I cut a dog mortise, vertical and longitudinal as seen at $z$, quite out at the end and down through the pendulum block, and then bore a hole through the dog mortise, near the bottom, through which to pass a pivot, to hold the dog in its place. I then make a saw cut, across the block, from the bottom upward at the pendulum end of the dog mortise, as seen at S, C, which serves to receive the spring. I then make a dog with teeth, as seen at M, with a hole near its lower extremity. I then bore two holes down through the pendulum block, as shown by $r$, $r$, section 11, for the confining of the block. I then make a spring as seen at N, the lower end filling the saw cut, while the body is narrow and moves freely in the mortise, keeping the dog to its place in the beam. I then make a pendulum as seen at 12, and section 12.

The pendulum body is made of wood, but, may be metal; near the edges, and a little below the upper end, I make two opening pivot boxes, which I construct in the following manner, viz: fixing upon two points, as centers; (at proper distances from each other) which centers I make the middle of the tops of the boxes, then, setting one foot, or point of a pair of compasses, in one center, and extending the other point beyond the center; as far beyond, as shall form half the width of the box; and turning the extended point, toward the lower end of the pendulum, moving, in distance, equal to the length of the box, which must be such, that, the bottom of the box cannot touch the opening pivot when the pendulum is in action. Then with the same distance between the points, I set one point in the opposite center, and in like manner, mark the outside of the other box; then, contracting the compasses sufficient to form the width of the opening pivot boxes, I, in like manner, mark the insides of the same. Then arching the tops of the boxes a little, I carefully cut them through, lining the arch at the top with metal, and making the boxes of such length, and width, that, the opening pivots shall not touch either box, except when the pendulum suspends itself upon one of the opening pivots, and then, the other must be free. I then make a slide, with a center box B. This center box is triangular, having a right line across the bottom, and the other two, a little curved; this box is of such dimensions, that, when the pendulum vibrates, suspending itself upon either of the opening pivots, the center box may not touch the suspending pivot. I also, make a regulating screw at the lower end, as seen at $h$, and fit on to the same, a screw collar, or collar screw, as seen at $c$. The slide, with the screw collar, I fit into the pendulum, in such manner, that, the angular point, in the top of the box, shall be in a horizontal line, with the tops of the opening pivot boxes, and in the center between both, while the collar of the regulating screw, is on, about the middle of the screw stem of the slide, forming the regulating screw. And I so fit the screw collar into the pendulum, that, it shall touch at both top, and bottom, and then secure the slide, by bars across the same; fastening down to the pendulum, as seen on the pendulum at $f$, $f$.

To the lower end of the pendulum, I attach a weight, as represented by $w$ $t$, in such manner, that, it can only vibrate with the pendulum. I then make a beam block as represented by $k$ $r$, and furnish it with bolts for the fastening of said block to the top of the boiler. I then make L $r$, the float beam; and make in it two mortises, one to receive the stem of the block $k$ $r$, and the other to receive the screw stem, which is attached to the bottom of the sliding, or float cylinder, and then bore holes for the pivots L$s$, L$s$, L$s$. I then make a float, as seen at L$f$, with a stem as shown by L$v$, and mortise the top of the stem through, to receive the beam. I then make the weight, as shown by L$t$.

To apply the working column, pendulum and safety valve to use, as herein described, and arranged; I proceed as follows, viz: I construct my boiler in any of the known forms, and apply thereto gage cocks, steam gage, pressure valve, and other appendages of such boilers; and in the top of the boiler, and in such situation as the drawings represent; I make the necessary perforations for the reception of the stationary cylinders, represented by I, J and K, and also one other perforation for the beam block; in which I secure said block, by bolting through the rim of the block, and the top of the boiler. I then, through one of the large perforations, introduce the float beam; and, having access through the perforations, I introduce the sliding cylinders; to the screw stem of which, I attach the float beam, and confine it between the screw collars. I then introduce, and attach the float, which I confine by a pivot. I then adjust the float beam, in the beam block, and suspend it by a pivot, and then having access through the perforation prepared for the stationary cylinder K, I by a pivot, suspend the weight L$t$, upon the float beam; as represented by Figs 1, and 3, of the annexed drawings. I next proceed to fit the cylinders represented by I, J and K, into their respective perforations, which I perform by carefully cutting away the top of the boiler, around each, until each cylinder shall fit the perforation thereunto belonging; and then, setting these cylinders into the perforations, made in the top of the boiler for that purpose; and then, through the perforations of their rims, I mark the boiler, then take out the cylinders, and make perforations at these marked places in the boiler; then, replacing the cylinders in the top of the boiler and then, through said rims effectually bolt them down to the top of the boiler. I then put the plate onto the cylinders, suspending the beam in the pivot post, by passing a pivot through both, post and beam; then screw the shafts together, adjusting them to their proper length, by turning them by their bolt wrenches; thus, tightening all the lids. I then place the pendulum upon the suspending pivot, with the opening pivots projecting through the opening pivot boxes, turning the regulating screw collar of the slide, until the center box B, is so situated, that, as much, but no more motion of rocking, or tilting from side to side, may be allowed, without the penlulum opening the valve, than I desire; the pendulum, and weight employed, being sufficient to open the valve, when their whole weight is brought to act upon the lever. I also surround the valve by a flue, to conduct away the steam. This reacting safety valve is so constructed, that, the lid 4, at the bottom of K, opening inward, being broader in diameter, than the other lid 4, upon the cylinder J, opening outward: The difference of their areas being such, that, the superior force of steam pressing upon the larger surface, keeps the valve tight, when it is not intended to open; and condensation of vapor within the boiler (when it shall take place) allows the pressure of the atmosphere, instantly to open the valve, it being greatest upon the inward opening cylinder, and being coupled by the beam, turning upon the same pivot, opens at the same motion, both sides; and the valve, being sufficiently capacious, prevents a rupture of the boiler, or flue, from its collapsing, in consequence of condensation of vapor within the boiler, and the dog, holding down the beam, prevents the valve from closing until it shall be liberated; and thus, an explosion from the force of the sudden formation of vapor within the boiler, is prevented, which frequently takes place immediately after the condensation. And in case of a rock, or tilt of the boat, in which, a boiler furnished with this valve, together with its appendages, is employed, if the rock be sufficient to endanger the boiler, or if it be greater than is allowed by the regulating screws; then, the pendulum, suspending itself upon one of the opening pivots, acting upon the lever, uplifts the sliding cylinder within J, and by the same motion, depresses the other within K, having only to exert a force denoted by the difference of the areas of J and K, added to the friction. The column of steam within the outward opening cylinder, exerting a force to the opening of the valve, in proportion, as its area, is to the area of the inward opening cylinder; being confined only by the greater force of steam, which is exerted upon the area of the surface of the end of the inward opening cylinder at K, and thus, at the first rock of the boat, the pendulum, opening the valve, an explosion is prevented; which happens in consequence of the water in the boiler, being brought into contact with the metal of which the boiler is composed; and the valve being kept open by the dog, an explosion is saved from the second rock, or tilt of the boat and boiler; which is far more dangerous than the first, a larger surface of the boiler, being exposed to the hot water, when the boat regains her first position, going beyond the center, from which she started at her first rock. At such lowness of water within the boiler, as is, or may be designed by the machinist, constructing or putting up the same, the water in the boiler, uncovering the float, allows it to act upon the sliding cylinder, at the bottom of the working column, drawing it down, allowing a column of steam, to apply the force of its pressure, to the uplifting of the sliding cylinder within I, of the working column. The area of the end of this sliding cylinder being such, that, added to the area of the lid of the outward opening cylinder, sliding within J, their sum is so much more than the area of the lid of the inward opening cylinder that, the employment of the working column, opens the valve. Thus avoiding all the ill consequence of the water in the boiler getting too low, whether it be the breaking of the boiler by collapse from condensation, or explosion from the sudden formation of vapor within the boiler, caused by a flow of water into a heated boiler and coming in contact with its sides.

The working column above described, is attached to the same beam, and at the same end of the beam, with the uplifting, outward opening cylinder of the safety valve. When this safety valve opens from the circumstance of low water in the boiler, and also, from the rocking, tilting, or careening of a boat, upon the boiler of which, such safety valve is employed, the steam within the stationary cylinder, shown by J, acting within the sliding cylinder, exerts an equal force upon the sliding cylinder within K, at the opposite end of the beam. Thus, one side of the valve becomes an assistant to the opening of the opposite side.

The above described pendulum may be suspended by a chain, and the bearing that, rests on the lever, to open the valve, may be a circular, inverted cup, the edges, setting over the rim of a smaller, but similar cup, not inverted, but resting on the lever, through which the pendulum rod should pass, that is, through both cup and lever. Thus the pendulum may be caused to act upon a lever, to the opening of a safety valve, let the vibrating motion of the pendulum be in what direction it may.

What I claim, is—

1. The employment of the apparatus termed the working column, in combination with the uplifting valve, and float, as herein described; whereby the pressure of steam on the working column, is added to the pressure on the safety, or uplifting valve, for the purpose of opening it, when the water descends below a given point; and which at the proper height of the water, permits the free action of the uplifting valve, as herein described.

2. And I also claim the employment of a pendulum, so situated, or so suspended, that by the rocking, tilting, or careening of the boiler, or boat, upon which, such pendulum shall be employed; the said pendulum shall so attach itself to, or so suspend itself upon a tackle, lever, or pivot, as thereby to apply its weight, as a moving power, to the opening of a safety valve, or valves for steam boilers, as herein described.

ABRAM PATTERSON.

Witnesses:
M. C. TYLER,
WALTER OLMSTED.